Feb. 26, 1924.
A. F. JENKINS
METAL WORKING TORCH
Filed April 12, 1922
1,485,033
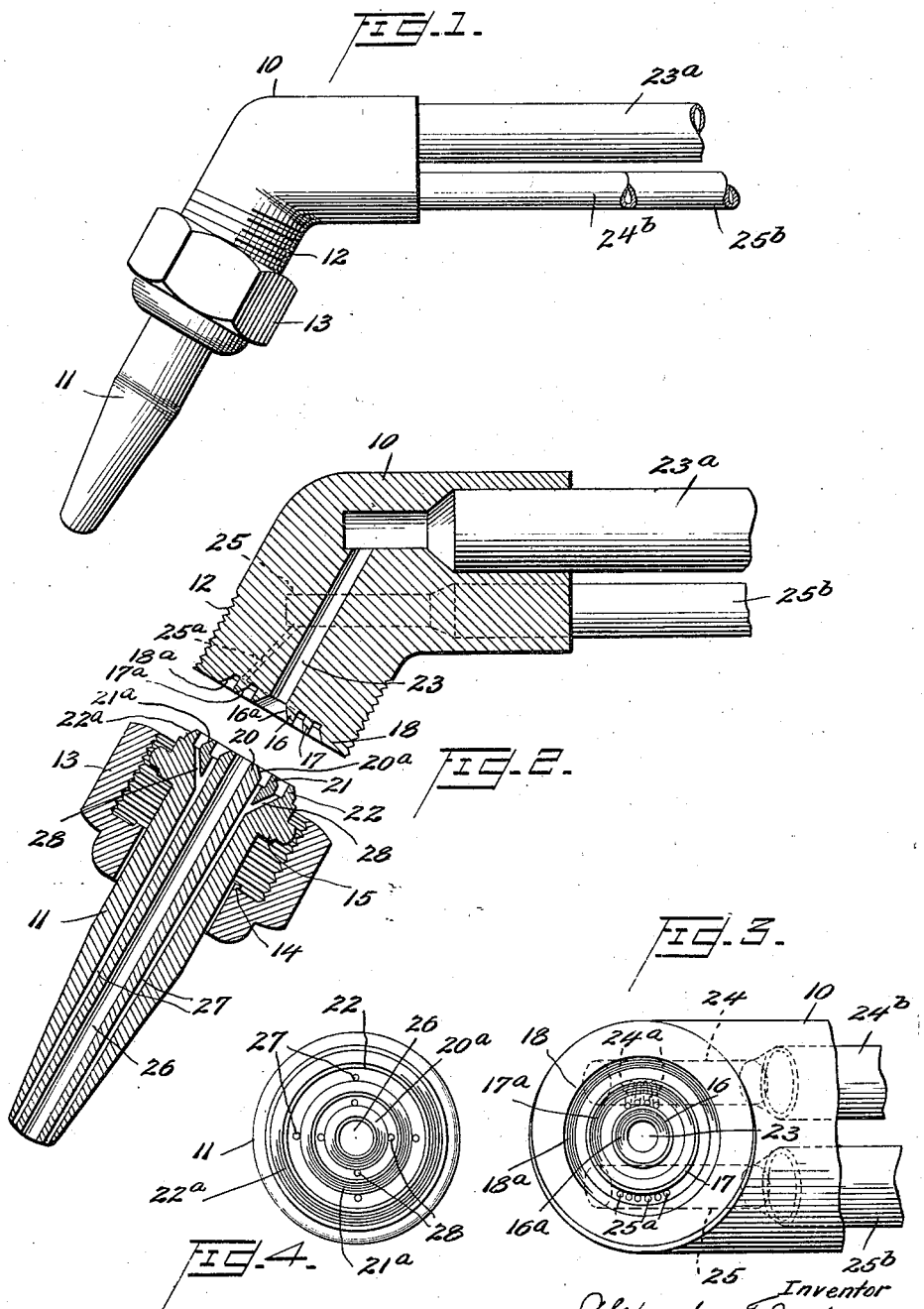

Patented Feb. 26, 1924.

1,485,033

UNITED STATES PATENT OFFICE.

ALEXANDER FREDERICK JENKINS, OF BALTIMORE, MARYLAND.

METAL-WORKING TORCH.

Application filed April 12, 1922. Serial No. 551,891.

*To all whom it may concern:*

Be it known that I, ALEXANDER F. JENKINS, a citizen of the United States, and residing at Baltimore city, State of Maryland, have invented certain new and useful Improvements in Metal-Working Torches, of which the following is a specification.

This invention relates to metal working torches and particularly to an arrangement for obtaining a tight seal or connection between the nozzle and head of the torch.

In metal cutting or welding torches the head is generally provided with a plurality of gas passages which are arranged to communicate with passages in the nozzle. It is necessary to provide seats or sealing surfaces between these passages to prevent premature mixing of the gases and at the same time render the nozzle readily detachable. In providing such seats or sealing surfaces it is very desirable to have the same inclined or arranged at an angle to the axis of the head and the nozzle since such inclined or conical seats generally provide a tight joint. Heretofore these results were obtained by providing the head with a deep conical socket to receive a conical end on the nozzle. This has been found objectionable because the expansion of the nozzle is apt to split or rupture the head. The present invention aims to provide an arrangement by which all of the advantages of conical seats or sealing surfaces are secured and which at the same time obviates the difficulties existing where the head is provided with a deep conical seat to receive the end of the nozzle.

The invention is described in the following specification and illustrated in the accompanying drawings in which—

Fig. 1 is a side elevation of a torch of the general character to which the invention is applied;

Fig. 2 is an elongated longitudinal section of a torch embodying this invention;

Fig. 3 an end view of the head showing the arrangement of parts which provides the seats or sealing surfaces;

Fig. 4 is an end view of the nozzle provided with seats for cooperating with the seats of the head.

Referring to the drawings in detail, 10 indicates the head of the torch and 11 the tip or nozzle which is adapted to be secured to the head. Any suitable means may be employed for clamping the nozzle against the head. As shown in the drawings, the head is provided on its exterior surface with screw threads 12 which are adapted to be engaged by a union nut 13, this nut being provided with an annular shoulder 14 which is adapted to engage an annular shoulder 15 on the nozzle. By this means the end of the nozzle can be drawn into tight engagement with the end of the head.

The surface of the head against which the nozzle 11 is to be clamped is provided with a plurality of shallow preferably circular concentric ribs 16, 17 and 18, and the nozzle 11 is provided with similar ribs 20, 21, and 22, which are adapted to cooperate with the ribs on the head. The head 10 is provided with a passage 23 which terminates within the confines of the rib 16 and which communicates with a suitable pipe $23^a$ for conducting gas to said passage. The head 10 is also provided with a passage 24 which communicates by means of one or more auxiliary passages $24^a$ with the depression between the ribs 16 and 17 of the head. A pipe $24^b$ is secured to the head for conducting gas to the passage 24. The head is further provided with a passage 25 which by means of suitable auxiliary passages $25^a$ communicates with the depression between the ribs 17 and 18 of the head, the passage 25 being supplied with gas from a pipe $25^b$ suitably secured to the head.

The nozzle 11 is provided with a central longitudinal passage 26 which terminates at its rear end within the confines of the rib 20 and which is adapted to communicate with the passage 23 of the head. The nozzle is also provided with passages 27 which terminate at their rear ends in the depression between the ribs 20 and 21 and which communicate with the passage 24 of the head. The nozzle is also provided with passages 28 which communicate with the passages 27 and extend laterally thereof and terminate in the depression between the ribs 21 and 22 of the nozzle, the passages 28 being in communication with the passage 25 of the head.

As already noted, the object of this invention is to provide a structure which will prevent premature mixing of the gases as they pass from the head into the nozzle. This result is effectively accomplished in the following manner. As will be seen particularly from Figure 2 of the drawing, the inner side of the rib 16 is beveled or inclined relative to the axis of the head and this is also true of the inner side of the ribs 17 and 18. These beveled surfaces provide a series of frusto-conical seats, 16ª, 17ª and 18ª. It will be noted that each of these seats is inclined in the same general direction relative to the axis of the head or, in other words, the apices of the cones of which the seats are a part, all point in the same direction. It will also be noted from Figure 2 of the drawings that the outer side of each of the ribs 20, 21 and 22 of the nozzle are also beveled or inclined relative to the axis of the nozzle whereby a plurality of frusto-conical seats 20ª, 21ª and 22ª are formed on the rear end of the nozzle. The inclination of the seats 16ª, 17ª and 18ª corresponds to that of the seats 20ª, 21ª and 22ª so that when the nozzle is brought into contact with the head of the inclined seats of the nozzle and the head will cooperate to form tight sealing surfaces.

It will be seen that the inclined seats 16ª, 17ª and 18ª of the head are arranged substantially in a plane perpendicular to the axis of the head, in other words, so arranged that such a plane will intersect each of said seats or prolongations thereof and such lines of intersection will be different distances from the axis of the head. It will also be seen that the corresponding seats on the nozzle 11 are also arranged substantially in a plane perpendicular to the longitudinal axis of the nozzle. This arrangement serves to permit a limited expansion of the nozzle relative to the head because when such expansion takes place the inclined seats on the nozzle may move relative to the corresponding inclined seats on the head with the result that fracture or splitting of the head is avoided.

It will therefore be seen that the foregoing construction provides means by which the nozzle can be connected to the head so as to obtain all the advantages of inclined or conical sealing surfaces between the gas passages and which at the same time obviates the difficulty heretofore experienced due to splitting or fracture of the head by expansion of the nozzle.

While the invention has been illustrated and described in connection with what is commonly termed a "cutting torch" it is, of course, apparent that the same may be employed with other forms of welding or heating torches. It is also apparent that the number of inclined seats on the head and nozzle may be varied to suit the requirements of the particular torch. Other obvious changes may also be resorted to without departing from the spirit of the invention or sacrificing any of the benefits thereof.

Having thus described my invention what I claim as new and desire to secure by Letters Patent is:

1. In a metal working tool, in combination, a head having on one end a plurality of inclined or beveled seats, one of which surrounds the other, said seats being spaced apart radially of the head and inclined relative to the axis of the head and being so arranged that a plane perpendicular to the axis of the head will intersect said seats or prolongations thereof at different distances from said axis, said head having a passage one end of which lies within the confines of the inner one of said seats and also having a second passage terminating between two of said seats, a nozzle having on one end a plurality of inclined or beveled seats, one of which surrounds the other, and which seats are adapted to cooperate with the seats of the head, the seats on said nozzle being inclined relative to the axis of the nozzle, said nozzle having passages for communicating with said passages of the head, and means for securing said nozzle to the head.

2. In a metal working tool, in combination, a head having on one end a plurality of spaced inclined or beveled seats one of which surrounds the other, said seats being spaced apart radially of the head and inclined relative to the axis of the head, and being arranged so that a plane extending transversely of and perpendicular to said axis will intersect each of said seats, said head having a passage one end of which lies within the confines of the inner one of said seats and also having a second passage terminating between two of said seats, a nozzle having on one end a plurality of inclined or beveled seats, one of which surrounds the other, and which seats are adapted to cooperate with the seats of the head, the seats on said nozzle being inclined relative to the axes of the nozzle, said nozzle having passages for communicating with said passages of the head, and means for securing said nozzle to the head.

3. In a metal working tool, in combination, a head having on one end a plurality of frusto-conical seats one of which surrounds the other, each of said seats being inclined relative to the axis of the head, and so arranged that a plane perpendicular to said axis will intersect said seats or prolongations thereof at different distances from said axis, said head having a passage one end of which lies within the confines of the inner one of said seats and also having a passage which terminates between two of said seats, a nozzle having on one end a plurality of frusto-conical seats arranged to cooperate with the seats on the head, said nozzle having passages for communicating with said passages of the head and means for securing said nozzle to the head.

4. In a metal working tool of the kind described, in combination, a head and a nozzle and means for securing the nozzle to the head, said head having on one end a plurality of concentrically arranged frusto-conical seats so positioned as to be intersected by a plane perpendicular to the axis of the head, said head having a passage one end of which lies within the confines of the inner conical seat and also having a passage which terminates between two of said seats, said nozzle also having a plurality of spaced frusto-conical seats for cooperating with the seats of the head, said seats on the nozzle also being arranged so as to be intersected by a plane perpendicular to the axes of the nozzle, and said nozzle also having passages communicating with said passages of the head.

5. In a metal working tool of the kind described, in combination, a head and a nozzle and means for securing the nozzle to the head, said head having on one end a plurality of spaced frusto-conical seats arranged so as to be intersected by a plane perpendicular to the axis of the head, each of said seats increasing in diameter from its inner toward its outer edge, said head having a passage one end of which lies within the confines of the inner conical seat and also having a passage which terminates between two of said seats, said nozzle also having a plurality of spaced frusto-conical seats for cooperating with the seats of the head, said seats on the nozzle being arranged so as to be intersected by a plane perpendicular to the axes of the nozzle and each increasing in diameter from its outer toward its inner edge, said nozzle also having passages for communicating with said passages of the head.

6. In a metal working tool of the kind described, in combination, a head having on one end a plurality of concentrically arranged circular ribs, said ribs being arranged substantially in a plane transverse to the axis of the head, one surface of each of said ribs being beveled and the beveled surfaces on each rib being inclined in the same general direction relative to the axis of the head, said head having a passage one end of which lies within the confines of the inner circular rib and also a passage which terminates between two of said ribs, a nozzle having on one end a plurality of concentrically arranged ribs for cooperating with the ribs of the head, the ribs of said nozzle being arranged substantially in a plane transverse to the axes of the nozzle, one surface of each of said last named ribs being beveled and the beveled surfaces thereof being inclined in the same general direction relative to the axes of the nozzle, said nozzle having passages for communicating with said passages of the head, and means for securing the nozzle to the head.

7. In a metal working tool of the kind described, in combination, a head having on one end a plurality of concentrically arranged circular ribs, said ribs being arranged substantially in a plane transverse to the axis of the head, the inner surface of each of said ribs being beveled and the beveled surfaces on each rib being inclined in the same general direction relative to the head, said head having a passage one end of which lies within the confines of the inner circular rib and also a passage which terminates between two of said ribs, a nozzle having on one end a plurality of concentrically arranged circular ribs for cooperating with the ribs of the head, the ribs of said nozzle being arranged substantially in a plane transverse to the axes of the nozzle, the outer surface of each of said last named ribs being beveled and the beveled surfaces thereof being inclined in the same general direction relative to the axes of the nozzle, said nozzle having passages for communicating with said passages of the head, and means for securing the nozzle to the head.

8. A head for a metal working tool having on one end thereof a plurality of concentrically arranged inclined or beveled seats, said seats being so arranged that each will be intersected by a plane perpendicular to the axis of the head, said head having a passage one end of which lies within the confines of the inner one of said seats and also having a second passage terminating between two of said seats substantially as described.

9. A member for use in a metal working tool, said member having a passage extending therethrough, a seat on one end of said member surrounding the end of said passage, said seat forming part of the inclined surface of a geometrical figure, the apex of which lies rearwardly of said end of the head, a second seat surrounding and radially spaced from said first named seat, said second seat forming part of the inclined surface of a second and different geometrical figure, the apex of which also lies rearwardly of said end of the member, said member having a second passage communicating with the space between said seats, substantially as described.

10. A member for use in a metal working tool, said member having a passage extending therethrough, a seat on one end of said member surrounding the end of said passage, said seat forming part of the inclined surface of a cone, a second seat surrounding and radially spaced from said first named seat, said second seat forming part of the inclined surface of a cone different from said first named cone, the apices of said cones pointing in the same general direction, said member also having a second passage communicating with the space between said seats, substantially as described.

11. A member for use in a metal working tool, said member having a passage extending therethrough, a seat on one end of said member surrounding the end of said passage, said seat forming part of the inclined surface of a cone, a second seat surrounding and radially spaced from said first named seat, said second seat forming part of the inclined surface of a cone different from said first named cone, the apices of said cones pointing in the same general direction, said seats being so arranged as to be intersected by a plane perpendicular to the longitudinal axis of said member, said member also having a second passage communicating with the space between said seats, substantially as described.

In testimony whereof I hereunto affix my signature.

ALEXANDER FREDERICK JENKINS.